ically to the latter.

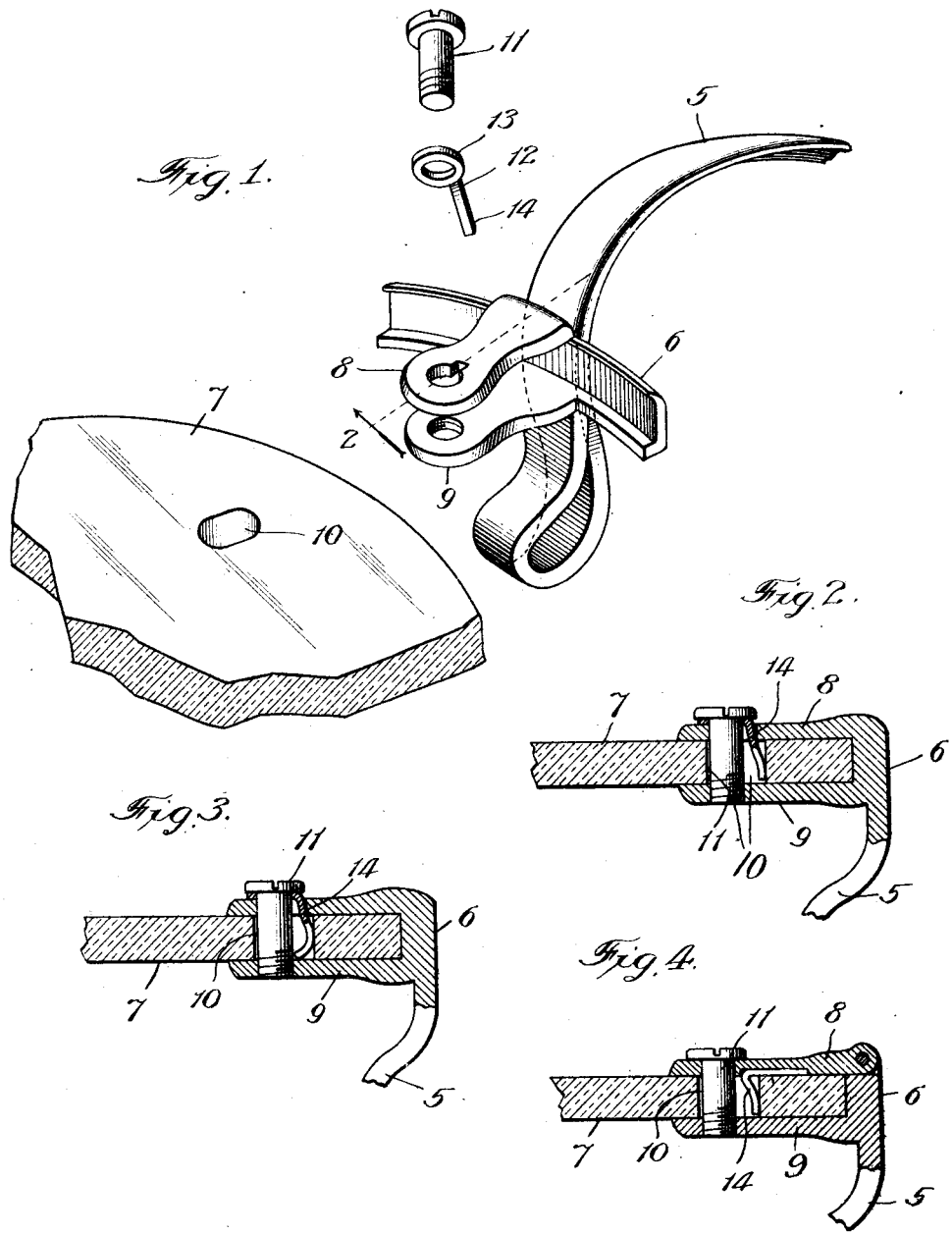

UNITED STATES PATENT OFFICE.

GEORGE S. PFEIFFER, OF CHICAGO, ILLINOIS.

MOUNTING FOR RIMLESS SPECTACLES AND EYEGLASSES.

1,072,159.

Specification of Letters Patent.

Patented Sept. 2, 1913.

Application filed March 22, 1913. Serial No. 756,120.

*To all whom it may concern:*

Be it known that I, GEORGE S. PFEIFFER, a citizen of the United States, residing at Chicago, in the county of Cook and State of Illinois, have invented a new and useful Improvement in Mounting for Rimless Spectacles and Eyeglasses, of which the following is a specification.

My invention relates to improvement in the construction of means for securing rimless lenses to the bridge-portion of spectacles or eye-glasses; my object being to provide simple, strong, durable and inexpensive attaching means which will operate to hold the lenses to the bridge or nose-piece with great security and steadiness while contributing sufficient resilience between the parts to practically obviate all danger of fracturing the lenses in the operation of securing the parts together, and furthermore to reduce danger of injury to the lenses in the handling of the eye-glasses or spectacles in use.

Referring to the accompanying drawing—Figure 1 shows the various features of the mounting in perspective and detached from each other; Fig. 2 is a sectional view of the assembled mounting taken on line 2 in Fig. 1; and Figs. 3 and 4, are views similar to Fig. 2 and illustrating modifications.

The bridge of nose-piece 5 may be of conventional form, either stiff, as is usual in spectacles, or resilient in the case of eye-glasses. At each end of the bridge is the usual arcuate bearing-strip 6, against which the lenses 7 fit at their inner ends. The strips 6 are concavo-convex in cross section to render them non-resilient and sufficiently stiff to be free from danger of becoming bent out of shape in use. Integral with the strips 6 are the perforated lens-embracing attaching clips or ears 8, 9. The lenses are provided near their inner ends with perforations 10, to register with the perforations in the clips 8 and 9 and receive the threaded fastening pins or screws 11. The screws 11 pass loosely through perforations in the clips 8 and engage the threaded perforations in the clips 9.

The reference numeral 12 designates a spring-piece having a collar-portion 13 and a resilient arm 14. The collar-portion 14 rests upon the clip 8 around the perforation in the latter and the spring-arm 14 extends partway through the perforation 10 in the lens. In the tightening of the screw 11, the arm 14 bears against the wall of the perforation 10 and presses the lens into the socket formed by the arcuate strip 6. The pressure of the spring-arms 14 serves to hold the lenses 7 in contact with the arcuate strips 6 with sufficient firmness to prevent vibration of the lenses in use, and the pressure exerted by the spring-arms is sufficiently yielding to overcome danger of fracturing the lenses in the adjustment of the parts and in the necessary handling of the spectacles or eye-glasses in use.

In the construction shown in Figs. 1 and 2, the spring-arm 14 is straight, or nearly so, and bears at its free end against the lens. In the construction shown in Fig. 3, the spring-arm 14 is bowed to bear at its free end against the screw 11 and bear between its ends yieldingly against the lens. In either case the tightening of the screw 11 causes the spring-arm 14 to press the lens against the unyielding arcuate strip 6. In the construction shown in Fig. 4, the clip 8 is hinged to the strip 6 and the spring-arm 14 is carried by the clip 8. The tightening of the screw 11 swings the clip 8 against the lens and causes the spring-arm 14 to press the lens yieldingly into the socket of the arcuate strip 6. While the connection between the lenses and the bridge should be such as to avoid vibration or shaking of the lenses, a rigid connection between the bridge and lenses is undesirable, owing to the brittle nature of the latter. A limited amount of resilience between the lenses and the bridge is advantageous and it is desirable that this resilience shall be at the perforation of the lens rather than at the arcuate strip 6. The latter should be sufficiently stiff and strong to avoid danger of its becoming distorted in use.

The foregoing description is intended to convey a clear understanding of my improvements in what I now believe to be the best form of their embodiment, and no undue limitation should be understood therefrom. It is my intention to claim all that is novel in my invention, and that the claims shall be construed as broadly as the prior state of the art may warrant.

What I claim as new and desire to secure by Letters Patent is—

1. In a lens-mount, the combination of a bridge, or nose-piece, provided with a bearing strip for the inner end of the lens, and lens-embracing clips, an attaching pin on the clips extending through a perforation in the lens, and a spring between said pin and strip bearing yieldingly against the lens, for the purpose set forth.

2. In a lens-mount, the combination of a bridge, or nose-piece, provided with a stiff arcuate bearing-strip for the inner end of the lens, and lens-embracing clips, an attaching pin on the clips extending through a perforation in the lens, and a spring between said pin and strip bearing yieldingly against the lens, for the purpose set forth.

3. In a lens-mount, the combination of a bridge, or nose-piece, provided with a bearing-strip for the inner end of the lens, and perforated lens-embracing clips, a screw engaging the clips and passing through a perforation in the lens, and a spring extending into the perforation of the lens and actuated by the tightening of the screw to press the lens yieldingly against said strip.

GEORGE S. PFEIFFER.

In presence of—
NELLIE B. DEARBORN,
OTTILIE C. AVISUS.

---

Copies of this patent may be obtained for five cents each, by addressing the "Commissioner of Patents, Washington, D. C."